April 12, 1932. J. C. BOGLE 1,853,194
GAS BURNER CONTROL SYSTEM
Original Filed March 21, 1927 2 Sheets-Sheet 1

Witness
Martin H. Olsen

Inventor
John C. Bogle

April 12, 1932.  J. C. BOGLE  1,853,194
GAS BURNER CONTROL SYSTEM
Original Filed March 21, 1927  2 Sheets-Sheet 2

Witness
Martin H. Olsen.

Inventor
John C. Bogle
By Inso, Addington, Ames & Aribold
Attys.

Patented Apr. 12, 1932

1,853,194

UNITED STATES PATENT OFFICE

JOHN C. BOGLE, OF GROSSE POINTE, MICHIGAN, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

GAS BURNER CONTROL SYSTEM

Application filed March 21, 1927, Serial No. 176,859. Renewed February 18, 1931.

This invention relates to a control system for gas burners and has special reference to a safety control system for a gas fired boiler or other appliances or apparatus employing gas for its operation.

Hereinafter this invention will be illustrated and described in connection with an automatic heating system although it is to be understood that this system may be employed wherever it is desirable to promote a substantially even temperature, to provide a periodic supply or demand, or any other instance wherein gas is permitted to flow to a burner at intervals.

Automatic heating systems are equipped with controls responsive to variations of temperature in a room or other enclosure to be heated. For example, such a control may comprise a wall thermostat capable of directing the generation of heat for assuring against substantial variations in the room temperature. Other forms of controls for automatic heating systems are those directing the specific limits of temperature to be obtained in the boiler or furnace. These latter instruments may include a water thermostat on a hot water heating boiler, a pressure switch on a steam or vapor boiler, or an air thermostat upon a warm air furnace.

Any of the above enumerated controls or several thereof may be so arranged in the present system as to govern the sequence of operation of the various devices in order that gas may be fed to the burners when desirable. In order to avoid complication of the drawings and disclosure, the several embodiments of this invention are primarily controlled by a simple room thermostat.

This invention is further enhanced by safety controls which operate to shut down the system in the event of failure of those controls previously recited to promote or sustain desirable conditions of combustion within the boiler or furnace.

Moreover, in order to illustrate the further usefulness of the control system, the invention has been incorporated in an automatic heating system wherein the burner is supplied with a mixture of gas and air under pressure.

Other objects will be apparent from the description and the drawings forming a part of this specification to which reference may now be had for a more complete understanding of the characteristic features of this invention, in which drawings.

Figure 1:
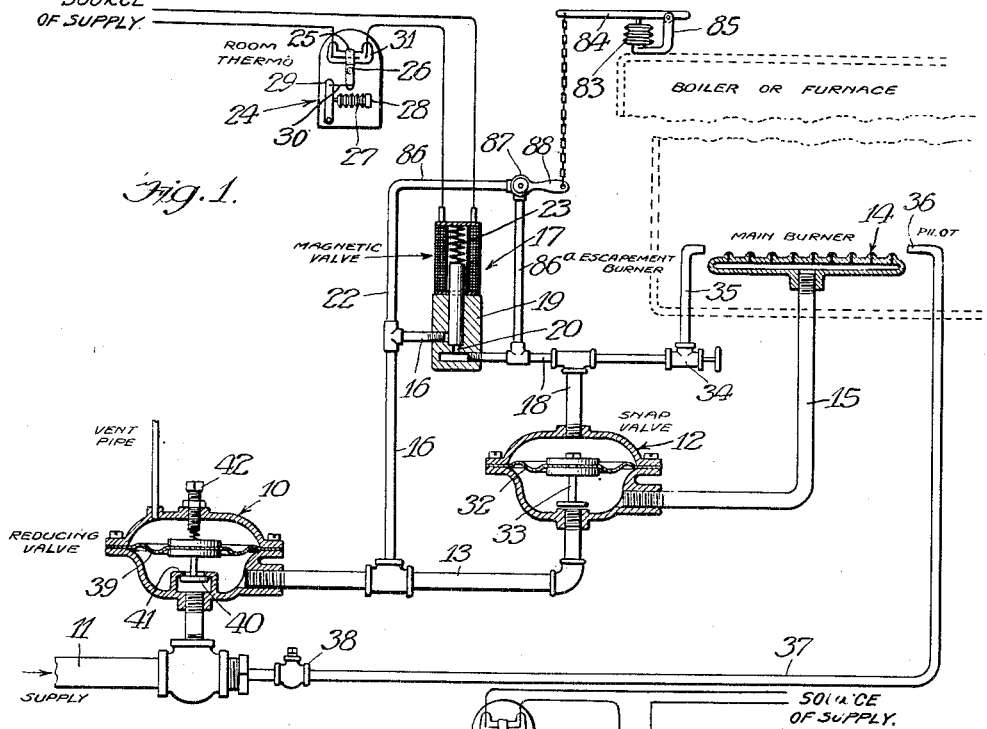
Figure 1 is a more or less diagrammatic view of a gas burner control system.

Referring to the drawings, and to Fig. 1 particularly, the control system comprises a reducing valve 10 which is directly connected to the main supply of gas 11. It is usual for gas to be supplied for domestic use at about six to eight ounces of pressure. The reducing valve 10 reduces this line pressure to any desired pressure, in this instance to about two ounces, which latter pressure is substantially constant. The gas under reduced pressure is directed to the lower chamber of a relay or snap valve 12 through a conduit 13, and thence to the main burner 14 through a conduit 15. In order to automatically control the supply of gas to the main burner so that the room temperature will remain substantially constant, some of the gas from the reducing valve 10 is by-passed to the upper chamber of the relay or snap valve 12 through conduits 16 which are connected to a magnetic valve 17 and then through the conduits 18.

The various devices of the control system will now be specifically described whereafter their operation in the system will be related. The reducing valve 10 is of the usual type having upper and lower chambers separated by means of a diaphragm 39, said diaphragm having a valve 40 secured thereto and extending into the lower chamber and seating against a suitable seat 41. An adjustable screw 42 is provided in the upper chamber for asserting a proper pressure upon the diaphragm 39, so that any desired pressure may be obtained within the lower chamber. It is desirable, although not essential, to the operation of the system to provide such a reducing valve since the pressure in the main line is not always constant and a considerable quantity of gas is withdrawn at certain times and lesser quantities at other times.

The electromagnetically operated valve 17 comprises a base member 19 which is drilled to provide inlet and outlet ports and valve chambers. The conduit 16 enters the inlet port formed at one side of the base 19, while the pipe 18 is connected to the outlet port formed in the opposite side and below said inlet port. A main port 20 connects the inlet and outlet openings, the port 20 being controlled by the movement of an iron plunger 21 which is vertically reciprocable in an upstanding tubular member 22, which latter is suitably secured to the metal base member 19 and rises substantially centrally therefrom, as shown. A spring 23 is secured between the top of the tubular portion 22 and the upper end of the plunger 21 whereby the plunger is maintained in position to close the main port 20 when the valve is de-energized. The tubular portion 22 comprises an electromagnetic coil of the usual construction. In the operation of this device, the coil is energized and the electromagnetic lines thread through the plunger 21 and the latter is raised against the action of the spring 23 whereby the degree of opening of the main port 20 is controlled.

A more thorough understanding of the construction and operation of this device may be had by reference to a copending application filed November 27, 1925, bearing Serial No. 71,860.

The magnetic coil is electrically connected to a room thermostatically operated switch 24 which controls the energization and de-energization of the electromagnetic coil. This room switch 24 may be of any usual type, but for the purposes of a specific illustration and means for a better understanding, the device has been shown in the drawings as comprising a mounting base of a suitable insulating material to which is secured a bracket 25, having a downwardly extending portion 26. A thermostatic element 27 of an expansible and contractible bellows type is supported by an extension 28 mounted on the insulating base. The other side of the bellows contacts with an actuating arm member 29, which latter occupies a substantially vertical position and is pivoted at its lower end to the insulating base. The upper end of the arm 29 is adjustably connected by means of a link 30 to the lower extension of the bracket 25, which bracket suitably supports a mercury contactor tube 31 of the usual type having a body of mercury and a pair of spaced cooperating electrodes disposed therein.

The bracket 25 is tiltably mounted on the insulating base and is actuated into its various positions by means of the bellows 27, which latter is provided with a highly volatile fluid, thus rendering the bellows sensitive to the slightest temperature change. The bellows 27 either contract or expand to move arm 29 which, being linked to the extension 26, causes the mercury tube to tilt in positions whereby the mercury contactor will be caused either to bridge the electrodes and to close the electrical circuit therethrough, or to flow in the opposite direction wherein the electrical circuit is opened.

For a better understanding of the elements of this device and the operation of the same, reference may be had to a copending application Serial No. 739,006 filed September 22, 1924 and assigned to my assignee.

The relay or snap valve 12 comprises upper and lower chambers separated by means of a diaphragm 32, the diaphragm in turn having mounted thereon a valve 33 for engagement with a valve seat provided in the connection between the conduit 13 and the lower chamber. In the operation of the snap valve 12, when the desired pressure is obtained in the upper chamber, this pressure will force the diaphragm to seat the valve and shut off the supply of gas in the conduit 13. When there is no pressure in the upper chamber or the pressure therein is reduced, the diaphragm permits the valve member to unseat and causes a flow of gas through the conduit 13 into the lower chamber and thence to the burner.

In the operation of the system thus far described, when the room, in which the thermostatically controlled device 24 is positioned, has reached a desired temperature, the change in temperature will cause the bellows 27 to tilt the contactor tube to a position wherein the mercury will bridge the electrodes and close an electrical circuit therethrough, which in turn will cause the plunger 21 to raise and permit a flow of gas through the conduit 16, the port 20, and the conduits 18 to the upper chamber of the snap valve 12. The gas thus obtained in the upper chamber causes a pressure on the diaphragm which seats the valve 33 and shuts off the supply of gas to the burner.

The pressure in the upper chamber above the diaphragm 32 is bled off through a throttling valve 34 which is so regulated that when the magnetic valve 17 is open more gas passes therethrough than can escape through the throttling valve. The throttling valve 34 has an extension 35 leading to a point adjacent the main burner so that the escaping gas upon passing through the throttling valve will be ignited by said burner. Thus, building up pressure on the top of the diaphragm 32 is the process of supplying more gas through the magnetic valve 17 than leaks out through the throttling valve 34.

A pilot burner 36 is positioned adjacent the main burner 14 to ignite the gas passing therethrough and is connected by means of the conduit 37 to the main supply conduit 11. The gas entering the conduit 37 is controlled by means of a suitable valve 38.

It will be noted that the flow of gas from the reducing valve 10 to the burner 14 is shut off by means of energizing the magnetic coil. In the event of failure of the electrical control device or of the supply of electrical energy to the electrical control devices, a mechanical boiler or furnace control device is shown which is automatically assigned to regulate the gas to the burner. This control will be dependent entirely upon the temperature or pressure of the furnace or boiler and assures against excessive variations of temperature in the room or other enclosure to be heated until either the supply of electrical energy is restored or manual adjustment of the defective electrical control devices becomes conveniently available.

A thermostatic element 83, preferably of the expansible and contractible bellows type is shown mounted on the boiler or furnace. In the event a furnace is employed, the bellows may be provided with a highly volatile fluid sensitive to temperature changes, or if a boiler is employed, the bellows may be actuated by a pressure obtained therefrom. A lever arm 84 is pivotally mounted on a support 85 and extends over the top of the bellows, said lever receiving a vertical movement as the bellows expands and contracts.

In the event of failure of the supply of electrical energy to the magnetic valve 17 whereby the supply of gas to the upper chamber of the snap valve 12 is shut off, a by-pass is shown for supplying gas from the conduit 16 to the conduit 18 comprising conduits 86 and 86ᵃ between which is connected a valve 87. When the valve 87 is open, gas can be passed therethrough faster than it can be bled away by the throttling valve 34 thus assuring a sufficient rise in pressure in the upper chamber of snap valve 12 to shut off the supply of gas to the main burner 14.

The lever arm 84 is suitably connected to an arm 88 which latter operates to open and close the valve 87. Should a flexible connection be used therebetween, the arm 88 should be operated in one of its directions by a spring member. In the operation of this mechanical control, when a predetermined high pressure or temperature is obtained in the boiler or furnace, the bellows expands to cause the valve 87 to open and permit a supply of gas to flow to the pressure chamber of the snap valve 12 thereby shutting off the supply of gas to the main burner 14.

When the temperature or pressure recedes to a predetermined low level, the bellows contracts to close the valve 87 and permit a supply of gas to the main burner 14. It will be apparent that both or either of the valves 87 and 17 may operate to supply gas to the snap valve 12 to regulate the supply of gas to the main burner although it will be seen readily that the only circumstance under which the mechanical control would operate would be upon the failure of the electrical control. This is of course due to the fine adjustment to be obtained by the thermostatically operated room switch 24.

Figure 2:
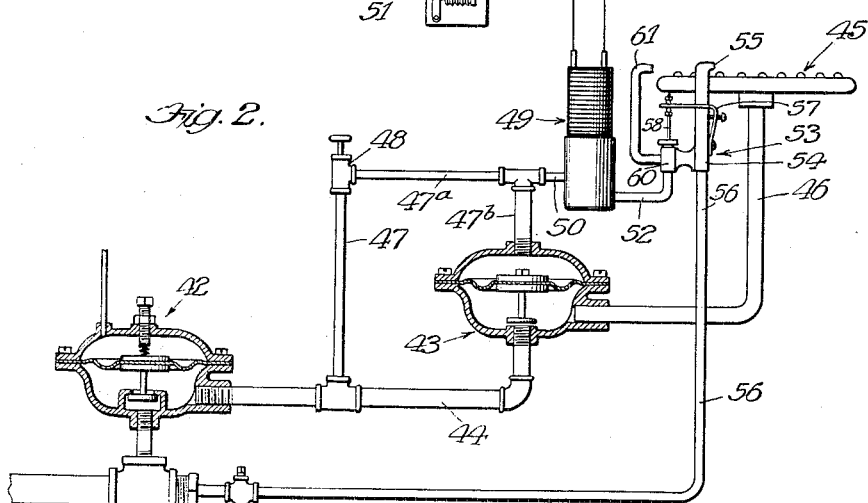
Fig. 2 is a view similar to Fig. 1 showing another form of control system.
Figure 3:
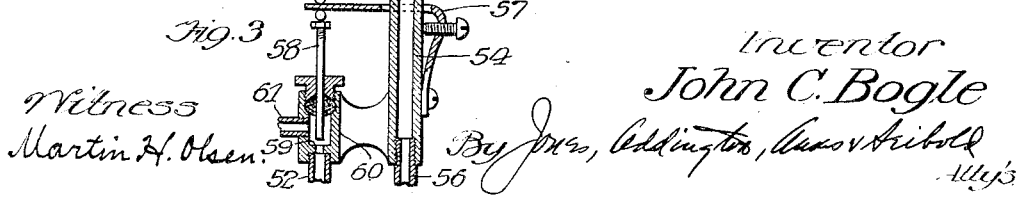
Fig. 3 is a vertical sectional view of the ignition device incorporated in the above control system.

Referring now more particularly to Fig. 2, an arrangement similar to Fig. 1 is shown wherein the gas is drawn into the reducing valve 42, and from thence to the snap valve 43 through the conduit 44 and to the burner 45 through the conduit 46. The snap valve 43 is of the same construction as the snap valve 12, that is, it comprises an upper and lower chamber separated by means of a diaphragm. A portion of the gas leaving the reducing valve 42 is by-passed to the upper chamber of the snap valve 43 through conduits 47, 47ᵃ and 47ᵇ, a throttling valve 48 being positioned between the conduits 47 and 47ᵃ. In this instance, the magnetic valve 49 is connected to a T fitting through conduit 50 and communicates with conduits 47ᵃ and 47ᵇ. The magnetic valve is not connected directly in the by-pass as in Fig. 1, although in other respects it functions similarly, more gas being capable of passing therethrough when open than can escape through the throttling valve 48. When magnetic valve 49 is closed the gas escaping through the throttling valve 48 builds up a pressure in the upper chamber of the snap valve 43. The magnetic valve 49 is connected to a thermostatically operated switch 51 and is operated thereby in the same manner as recited in the previously described figure. The conduit 50 is connected to the inlet port of the magnetic valve 49 and the outlet therefrom is connected to a safety pilot by means of the conduit 52, which safety pilot will now be described.

The safety pilot 53 comprises an elongated tubular member 54 having an aperture 55 at its upper end through which gas is permitted to escape in order to ignite the main burner 45. Gas is supplied through conduit 56 to the lower portion of the tubular member 54, said tubular member being of a relatively high coefficient of expansion. A spring member 57 is suitably attached at one of its ends to the tubular member 54 and is perforated to permit the tubular member 54 to pass therethrough. The spring member 57 extends at right angles to the tubular member and has secured at its outer end a valve stem 58, which latter projects downwardly through a packing gland to a point adjacent a seat 59 in a valve housing 60. The valve stem 58 has a lower coefficient of expansion than that of the tubular member 54. The conduit 52, which extends from the magnetic valve 49, is connected to the valve 60 at a point below the seat 59. A conduit 61 is connected to the valve housing 60 at a point above the seat 59 and communicates with the port provided between the packing gland and the seat 59, said conduit 61 extending upwardly and adjacent to the main burner 45 where gas emitted therefrom is ignited by said burner.

In the operation of the safety pilot the valve stem 58 is normally open as the pilot light 55 is constantly ignited. Heat proceeding from the flame, which emerges from the pilot port, will cause the tubular member 54 to expand more than the valve stem, thereby providing a spaced relation between it and its seat; however, should the pilot light be extinguished, the tubular member 54 will contract faster and to a greater degree than the valve stem 58 thereby causing the latter to seat and shut off the supply of gas through the conduit 52.

In the operation of this system, when the room in which the thermostatically controlled switch 51 is positioned has cooled, the electromagnetic valve 49 is caused to open thereby relieving the pressure in the top chamber of the snap valve 43 and permitting gas from the reducing valve 42 to pass through to the burner 45. When a desired temperature has been obtained in the room in which the switch 51 is positioned, the switch automatically closes the magnetic valve 49, thus directing the by-passed gas downwardly through conduit 47$^b$ and building up a pressure in the upper chamber of the valve 43, which causes the valve in the lower chamber to seat and shut off the supply of gas from the reducing valve 42 to the burner 45.

When gas is by-passed through the throttling valve 48 and the magnetic valve 49 is open, this gas passes through the conduit 52, the valve 60 and the extension 61 to be ignited by the burner 45. However, when the magnetic valve 49 is closed, the by-passed gas then passes directly to the upper chamber of the snap valve 43. Should the thermostatic switch 51 be in a position such that the magnetic valve 49 is open permitting of a supply of gas to the burner 45, and should the pilot light 55 not be ignited, the valve stem 58 closes the passage-way through the valve 60 and causes a pressure to be built up in the upper chamber of the snap valve 43 to shut off the supply of gas from the reducing valve 42 to the burner 45. It is apparent, therefore, that the valve 60 and the magnetic valve 49 act in a similar manner to perform the same function.

Figure 4:
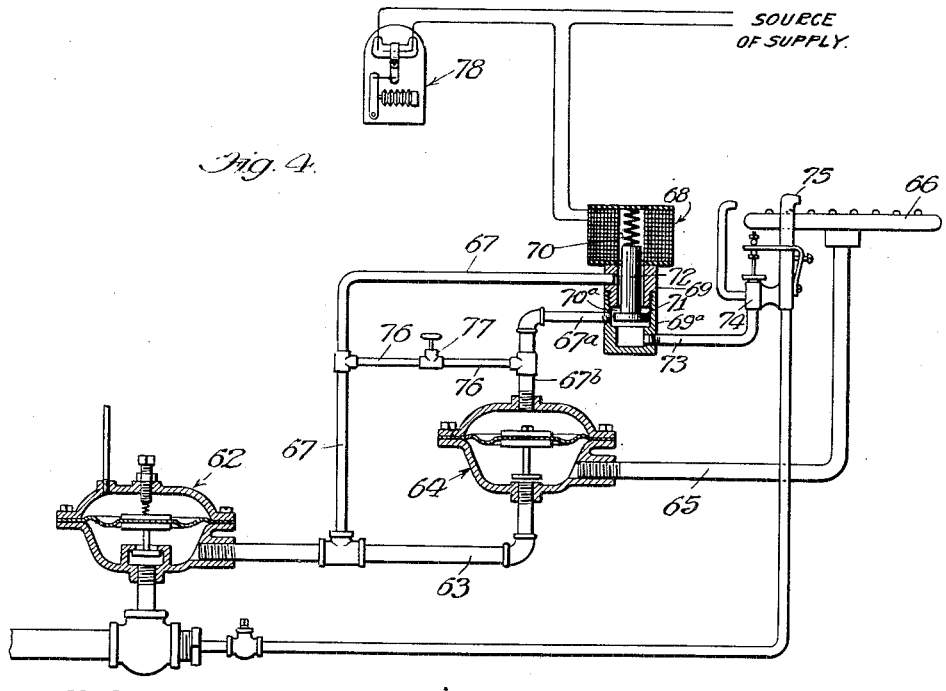
Fig. 4 is a view similar to Figs. 1 and 2, showing another form of gas control system.

Referring now to Fig. 4 of the drawings, a further modification of the same idea, as involved in the preceding figures, is found. Gas is supplied to the reducing valve 62 from the main supply and passes therefrom through conduit 63 to the lower chamber of the snap valve 64 and from thence through conduit 65 to the burner 66. A portion of the gas from the reducing valve 62 is by-passed through the conduits 67, 67$^a$ and 67$^b$ to the upper chamber of the snap valve 64. In place of the magnetic valve, as described in the previous figures, a two-way magnetic valve 68 is shown comprising a two-part body portion 69 and 69$^a$ having a central opening 70 in which is disposed a valve head 71 mounted on an iron plunger 72 slidable vertically in a central core portion of the upper body portion 69. The conduit 67 is connected to the upper body portion and communicates with the central core portion thereof, and the conduit 67$^a$ is connected to the port 70$^a$, the junction between said core portion 70 and said port 70$^a$ providing a seat for the valve 71 in its upper position. A conduit 73 is connected to a passageway in the lower body portion 69$^a$ which is in communication with the port 70$^a$, the junction between said port 70$^a$ and said passageway providing a seat upon which the valve 71 will seat in its lower position. The other end of the conduit 73 is connected to the valve 74 of the safety pilot 75.

The reducing valve 62, snap valve 64, burner 66, safety pilot 75 and the room thermostat 78 have the same construction and have similar functions to the corresponding elements in the previously described figures. In the operation of this device, when the room in which the thermostatic switch 78 is disposed has cooled to a predetermined degree, an electrical circuit is completed therethrough which energizes the coil of the magnetic valve 68 and causes the plunger 72 to raise to its upper position, wherein communication between conduits 67 and 67$^a$ is shut off through the valve 68, although communication is established therethrough by the medium of a throttling valve 77 disposed in a by-pass conduit 76 between said conduits 67 and 67$^b$. The quantity of gas passing through the valve 77 is of a magnitude much smaller than that which is permitted to pass through the valve 74 to be burned by the burner 66, thereby permitting escape of the gas and preventing pressure from being built up in the upper chamber of the snap valve 64 or relieving any pressure which has been built up therein. This action allows gas from the reducing valve 62 to pass through conduits 63 and 65 to the burner.

When a desired temperature has been obtained in the room, the circuit is broken through the switch 78 which causes a deenergization of the magnetic coil in the valve 68 thereby releasing the plunger 72 which latter is caused to seat and shut off the passage of the gas from the conduit 67 to the conduit 73. The gas from the conduit 67 now passes through the central core of the upper body portion 69 and through the conduit 67ᵇ to the upper chamber of the snap valve 64. Likewise gas passing through the throttling valve 77 is directed downwardly through the conduit 67ᵇ to the upper chamber of the snap valve 64. These gases then produce a pressure in the upper chamber which acts upon the diaphragm to seat the valve and shut off the supply of gas 63 of the burner.

The safety pilot operates the same in this modification as has been described in its operation in Fig. 2, the conduit 73 being closed whereby the gas is forced into the upper chamber of the snap valve 64 to shut off the supply of gas to the burner when the pilot light does not function normally.

Figure 5:
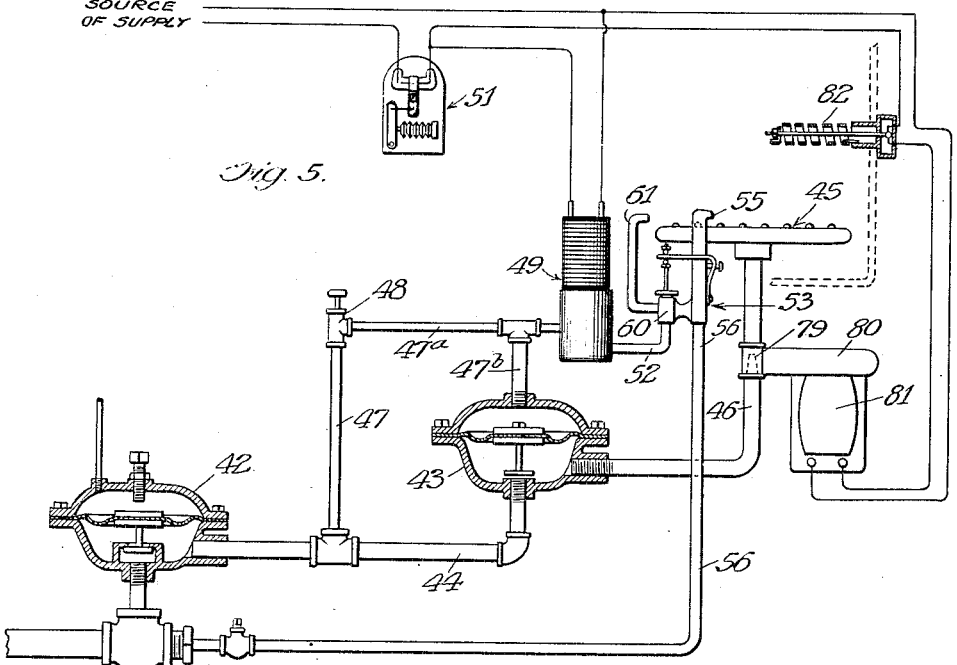
Fig. 5 is a view similar to Fig. 2 and in addition thereto incorporating an arrangement whereby the burner is supplied with a mixture of gas and air under pressure.

Referring now to Fig. 5, the system shown therein incorporates the same elements as are shown in Fig. 2 with the addition of means for forcing air into the gas supply line to mix with the gas to produce a mixture of gas and air under pressure in the burner. Also a thermostatically operated stack switch is shown mounted in the boiler in which the burner is installed and is for the purpose of controlling the air forcing means.

Gas is admitted to the reducing valve 42 and from thence to the conduit 44 to the lower chamber of the snap valve 43 and to the conduit 46. An ordinary gas and air mixer 79 is disposed in the conduit 46 and receives a supply of air under pressure from any source of supply such as a fan 80 operated by a motor 81. After the gas passes through the air and gas mixer 79, it is directed to the burner 45.

The gas from the reducing valve 42 to the main burner is regulated in the same manner as is described in Fig. 2, that is, by means of the thermostatic control 51 and the magnetic valve 49, the pressure being built up in the upper chamber of the snap valve 53 to shut off the supply of gas to the main burner when the switch 51 closes the valve 49, and the pressure being reduced in the snap valve to permit a flow of gas to the burner 45 by means of the thermostatic switch 51 opening the valve 49.

When the room in which the thermostatic switch 51 is positioned becomes cool, the electromagnetic valve 49 opens to reduce the pressure in the upper chamber of the snap valve 43, which permits gas from the reducing valve 42 to pass through the conduits 44 and 46 to the burner 45. These gases are ignited by the pilot light 55 and after a predetermined interval, that is, when sufficient heat has been obtained in the boiler, a stack switch 82, which will hereinafter be described, is actuated to complete a circuit through the motor 81, which in turn operates the fan 80 to cause air to mix with the gas in the conduit 56. It will be noted from the above that a sufficient time will have elapsed to complete the ignition of the gas passing through the burner 45 before the gas will be placed under pressure. However, upon the opening of the electrical circuit in the room thermostat 51, the magnetic valve 49 will become deenergized at the same time as the circuit is broken through the motor 81.

The stack switch 82 comprises a helical bimetallic element 89 disposed adjacent the end of a tube 90 and in axial alignment therewith. One end of the helical element is secured to the tube and the other end is secured to a rod 91 extending through both the tube and a casing 92 on which the tube 90 is mounted. A mercury tube contactor 93, having a pair of electrodes and a body of mercury disposed therein, is mounted on the end of the rod 91. In the operation thereof, when the helical bimetallic element 89 is heated, one end thereof being fixed to the stationary tube 90, the other end will rotate to cause a rotation of the rod 91 which in turn tilts the contactor 93 and causes the mercury therein to either bridge the electrodes and make an electrical circuit therethrough or will rotate to cause the mercury to break the electrical circuit therethrough. The operation of this device is more clearly illustrated and described in the copending application filed December 17, 1925 and bearing Serial No. 75,895 to which reference may be had for a more detailed description of the structure and operation thereof.

In the wiring of the apparatus of this embodiment, one side of the line from the source of supply is connected to one of the electrodes of the room thermostatic switch 51, the other electrode being connected to one side of the electromagnetically controlled valve 49 and one of the electrodes of the contactor of the stack switch 82. The other side of the valve 49 is connected to the other side of the line and the other electrode of the stack switch 82 is connected through the motor 81 to the last mentioned side of the line. Thus, both the valve 49 and the stack switch 82 are connected in series with the switch 51. When an electrical circuit is completed through the room switch 51, the valve 49 is closed to permit a supply of gas to the burner where it is ignited. The hot gases from the burner actuate the helical bimetallic element 89 to complete an electrical circuit through the stack switch which operates the motor thereby causing a mixture of gas and air under pressure to flow to the burner. Upon obtaining a desired temperature in the room, the switch 51 terminates the operation of the motor and shuts off the gas to the burner simultaneously.

In the various embodiments herein shown and described, it is to be understood that a plurality of safety pilots may be employed to operate a plurality of burners and that these pilots may be arranged in series one with the other whereby the failure of any or all pilots may result in the complete termination of the control system. This invention, then, is not to be limited to the specific structure shown and described since various modifications may be apparent to those skilled in the art without departing from the spirit and scope of this invention, and therefore, the same is to be limited only by the scope of the appended claims and the prior art.

I claim:

1. A control system for gas burners comprising a valve having chambers therein, one of said chambers being connected to said gas burner and being supplied with gas from the main supply, and means for directing a supply of gas from said main supply to the other of said chambers comprising a pair of mechanically operated valves whereby when either of said valves is open a pressure is created in said last mentioned chamber to shut off the supply of gas from said first mentioned chamber to said burner and when both of said valves are closed the pressure is reduced to permit a flow of gas from said first mentioned chamber to said burner.

2. A control system for gas burners comprising a valve having chambers therein, one of said chambers being connected to said gas burner and being supplied with gas from the main supply, electrically actuated means for controlling the amount of pressure in the other of said chambers to regulate the supply of gas from said first mentioned chamber to said burner, and mechanical means associated with said electrically actuated means for assuming control of said pressure upon failure of electrical energy.

3. A control system for gas burners comprising a valve having chambers therein, one of said chambers being connected to said gas burner and being supplied with gas from the main supply, a conduit from said main supply to the other of said chambers for admitting a supply of gas thereto, an electrically controlled valve in said conduit for controlling said gas supply to said last mentioned chamber whereby the supply of gas is regulated from said first mentioned chamber to said burner, and a mechanically operated valve in said conduit for assuming control of said pressure upon failure of electrical energy.

4. A control system for gas burners comprising a valve having chambers therein, one of said chambers being connected to said gas burner and being supplied with gas from the main supply, a by-pass for directing gas from said main supply to the other of said chambers, an electrically controlled valve connected in said by-pass for controlling the supply of gas to said last mentioned chamber, a mechanically operated valve connected in a by-pass around said electrically operated valve and for assuming control upon failure of electrical energy, and a throttling valve communicating with said first mentioned by-pass between said valve and said last mentioned chamber for bleeding off the pressure in said latter chamber when either or both of said valves are closed, said throttling valve being of a capacity whereby a pressure is obtained in said last mentioned chamber when either or both of said valves are open, the pressure in said chamber regulating the flow of gas from said first mentioned chamber to said burner.

5. A control system for gas burners comprising a valve with chambers therein, one of said chambers being connected to said gas burner and being supplied with gas from the main supply, a conduit between said main supply and the other of said chambers, a throttling valve in said conduit for bleeding off the pressure in said last mentioned chamber, electrically actuated means for controlling the amount of pressure in said last mentioned chamber to regulate the supply of gas from said first mentioned chamber to said burner, and mechanical means associated with said electrically actuated means for assuming control of said pressure upon failure of electrical energy.

6. A control system for gas burners comprising a main valve connected to the gas burner and to a main source of gas supply, a gas pressure operated device for controlling the main valve, and means for directing a supply of gas from said main supply to said pressure operated device comprising a pair of valves whereby when either of said valves is open, a pressure is created in said pressure operated device to shut off the supply of gas through said main valve to the burner, and when both of said valves are closed the pressure is reduced to permit a flow of gas through said main valve to said burner.

7. A control system for gas burners comprising a main valve connected to a burner and a main source of gas supply, a gas pressure operated device for controlling the main valve, electrically actuated means for controlling the amount of pressure obtaining in said pressure device to regulate the supply of gas from the main valve to the burner, and mechanical means associated with said electrically actuated means for assuming control of said pressure upon failure of electrical energy.

8. A control system for gas burners comprising a main valve connected to a burner and a main source of gas supply, a gas pressure operated device for controlling said main valve, a conduit from said main gas supply to said gas pressure operated device, electrically actuated means in said conduit for controlling the pressure obtaining in the said pressure operated device to control the gas supply from said main valve to said burner, and mechanical means in said conduit for assuming control of said pressure upon failure of operation of said electrically actuated means.

9. A control system for gas burners comprising a main valve connected to a burner and a main source of gas supply, a gas pressure operated device for controlling said main valve, a by-pass for directing gas from said main supply to said pressure operated device, electrically actuated means in said by-pass for controlling the amount of pressure in the said pressure operated device to regulate the supply of gas from the main valve to the burner, mechanical means connected in a by-pass around said electrically actuated means for assuming control of said pressure upon failure of operation of said electrically actuated means, and a throttling valve communicating with said first by-pass for bleeding off the pressure in said pressure operated device when either or both of said main valves and said pressure operated device are closed, said throttling valve being of a capacity whereby a pressure is obtained in said pressure operated device when either or both of said valves are open, the pressure obtaining in said pressure operated valve regulating the flow of gas to said burner.

10. A control system for gas burners comprising a main valve connected to a burner and a main source of gas supply, a gas pressure operated device for controlling said main valve, a conduit from said main gas supply to said gas pressure operated device, a throttling valve in said conduit for bleeding off the pressure obtaining in said gas pressure operated device, electrically actuated means for controlling the amount of pressure in said gas pressure operated device to regulate the supply of gas to said burner, and mechanical means associated with said electrically actuated means for assuming control of said pressure upon failure of operation of said electrically actuated means.

In witness whereof, I have hereunto subscribed my name.

JOHN C. BOGLE.